United States Patent [19]

Huang et al.

[11] 4,453,193
[45] Jun. 5, 1984

[54] OVERCURRENT PROTECTION FOR PUSH-PULL CIRCUITS

[75] Inventors: Rex H. Huang, Salem; John R. Hale, Roanoke; William D. Brackman, Jr., Salem, all of Va.

[73] Assignee: General Electric Company, Salem, Va.

[21] Appl. No.: 433,467

[22] Filed: Oct. 12, 1982

[51] Int. Cl.³ .................... H02H 7/10; H02H 7/20
[52] U.S. Cl. ......................... 361/98; 361/86; 361/93; 361/87; 363/50; 363/56
[58] Field of Search .................. 361/98, 93, 94, 86, 361/87, 88, 89, 18, 101; 330/207 P, 298; 363/55, 56, 57, 50, 96, 97, 26, 25

[56] References Cited

U.S. PATENT DOCUMENTS

| | | | |
|---|---|---|---|
| 3,748,537 | 7/1973 | Vigini | 361/86 |
| 3,896,341 | 7/1975 | Kodama | 361/86 |
| 4,150,424 | 4/1979 | Nuechterlein | 363/26 |
| 4,293,902 | 10/1981 | White | 363/26 |

*Primary Examiner*—Patrick R. Salce
*Attorney, Agent, or Firm*—Ormand R. Austin; Arnold E. Renner

[57] ABSTRACT

Overcurrent protection is obtained in a push-pull network by circuitry repeatedly comparing signals indicative of the instantaneous current flow through the push-pull switching elements with a synchronized reference signal whose value is preferably made to decline during the ON periods of the current switches. Thus, the reference signal may initially be set relatively high to accommodate a moderately high in-rush transient and then to decline to lower levels over the remainder of the time the switching elements are on. At any time that the current signals exceed the compared to reference value, the corresponding current switch is deactivated as a protective measure.

9 Claims, 3 Drawing Figures

OVERCURRENT PROTECTION FOR PUSH-PULL CIRCUITS

This invention relates to protective circuitry for guarding against damaging effects of excessive electrical current and, more particularly, to such circuitry for protecting against excessive currents in push-pull type circuits.

BACKGROUND OF THE INVENTION

The well known push-pull circuit is diversely applied in the field of electrical engineering and finds use, for example, as an amplifier in power conversion equipment such as dc to ac inverters and dc to dc converters.

Recently, these power control circuits have employed semiconductor devices (such as metal oxide semiconductor field effect transistors) as the power switching elements. While these devices offer considerable advantage in many respects, they are sensitive to transient and long-term overcurrent conditions which, if unprotected against, can cause destruction of the semiconductor switching elements and corresponding failure of the circuitry within which they are employed.

There are at least three causes of overcurrent which can damage these semiconductor power switches:

1. Excessive transient in-rush current at the moment power is initially applied, i.e., at turn-on;
2. Near the end of the active or conducting period, the transformer used in circuits of this type may tend toward saturation resulting in an extraordinarily high current; and,
3. The output load may become excessive due, for example, to an overload or a short circuit on the output of the inverter or converter circuitry.

In view of these problems, it is an object of the present invention to provide protection circuitry, for use in push-pull networks, which guards the semiconductor switches and other circuit elements of the push-pull network against the damaging effects of excessive current. This, and still further objects, advantages, and uses of the invention will be apparent from the ensuing description.

SUMMARY OF THE INVENTION

In a push-pull network, overcurrent protection is obtained in circuitry according to the invention by repeatedly comparing signals indicative of the instantaneous current through the switching elements with a synchronized reference signal whose value is preferably made to decline during the ON periods of the current switches. Thus, the reference signal may initially be set relatively high to accommodate a moderately high in-rush transient and then to decline to lower levels over the remainder of the time the switching elements are on. At any time that the current signals exceed the compared to reference value, the corresponding current switch is deactivated as a protective measure.

In preferred form, the invention includes current sensing means to provide the current indicative signals; means responsive to the current signals to generate a synchronizing signal; a reference source to produce the synchronized reference signal whose value is time dependent during the active periods of the current switching elements; means to compare the reference signal and current signals; and means to deactivate, or switch off, the current elements, or switches, in the event the instantaneous current becomes excessive as detected by comparing the reference and current signals.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1A:
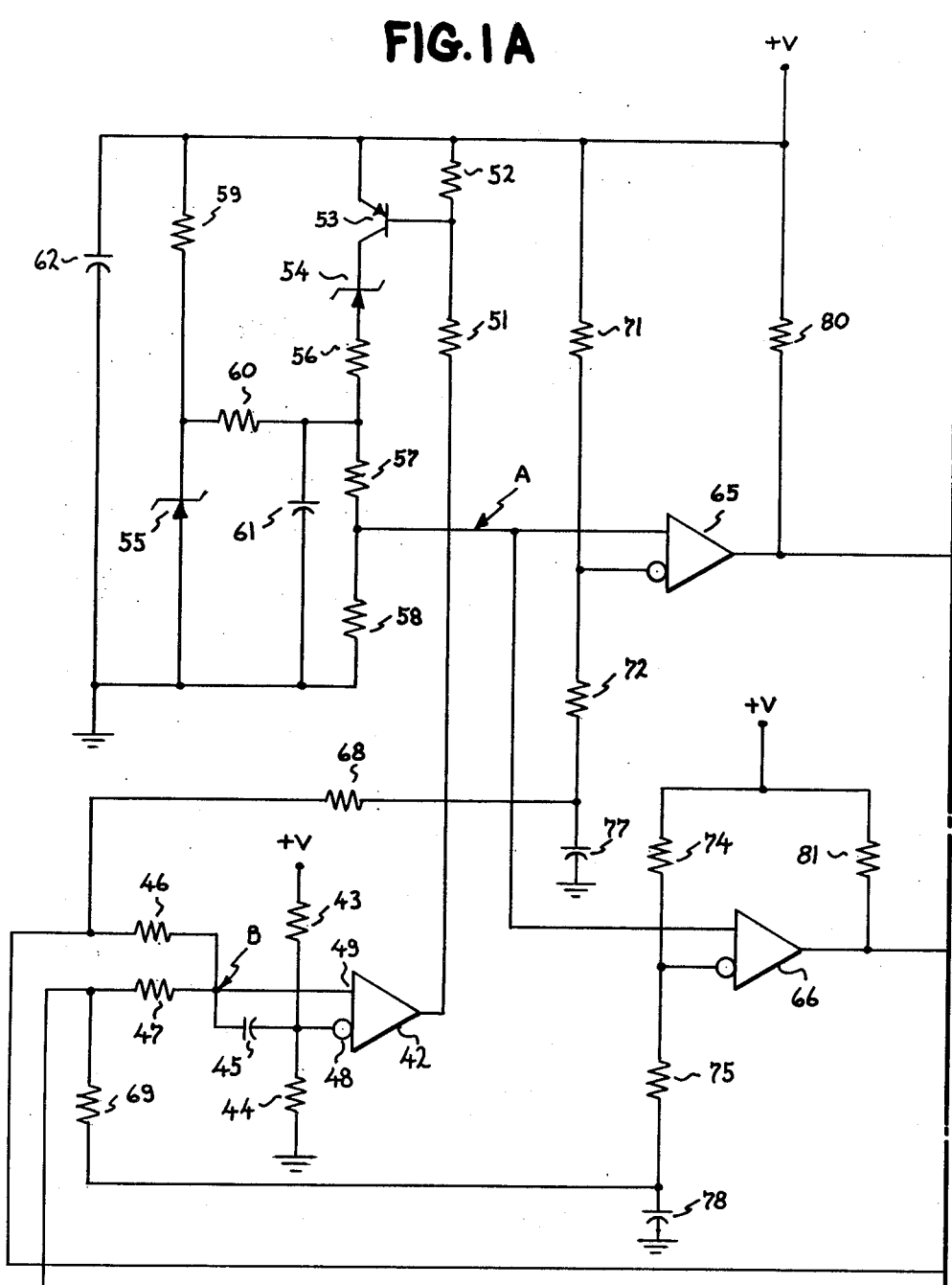
FIGS. 1A and 1B, taken together, provide a detailed schematic circuit diagram of a preferred form of the invention for use in push-pull dc to ac inverter circuit.
Figure 1B:
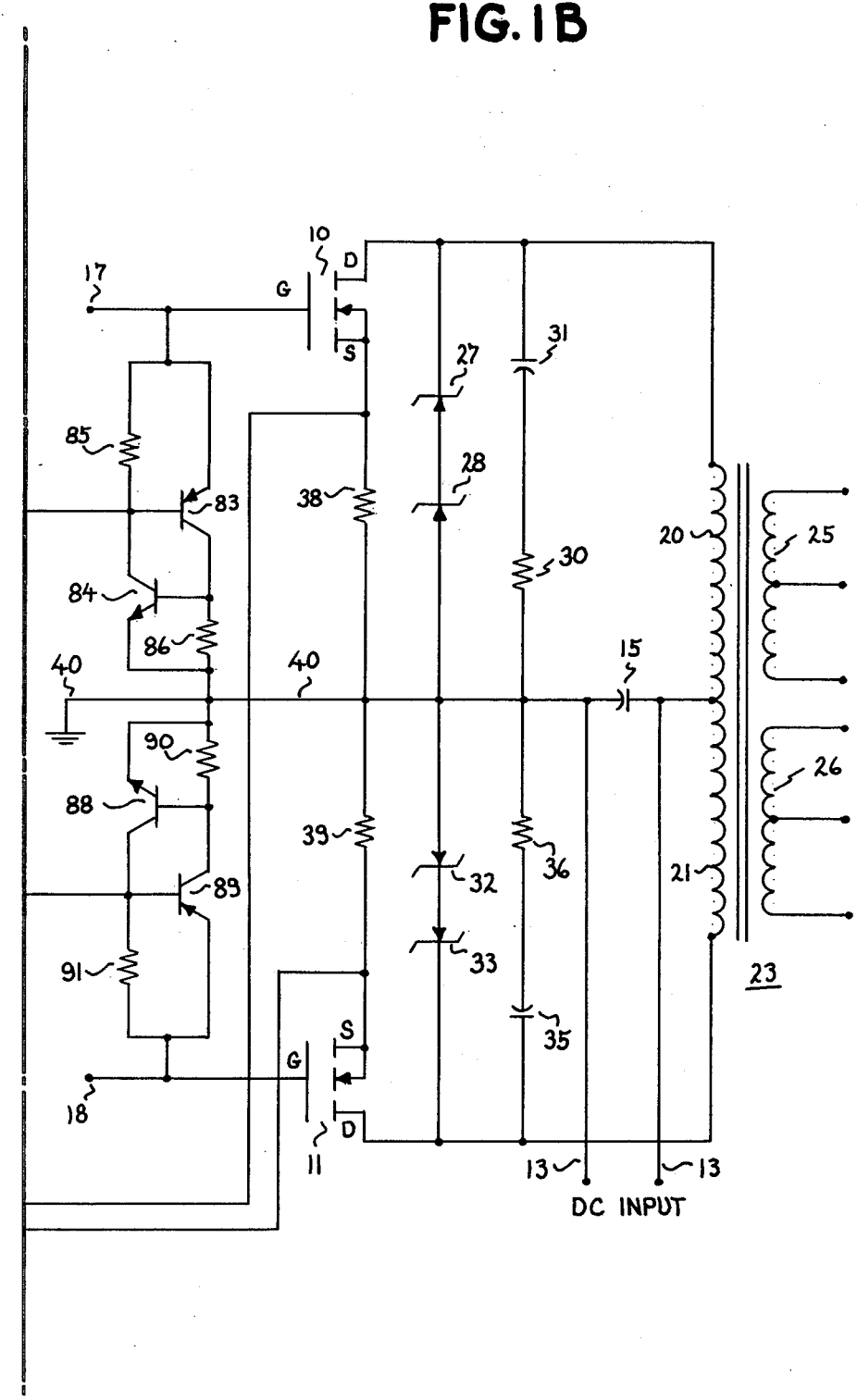

Referring to FIGS. 1A and 1B, a pair of metal oxide semiconductor field effect transistors (MOSFET's) 10 and 11 serve as the switching elements in a push-pull network of a dc-to-ac inverter apparatus. The dc voltage is brought in at terminals 13 and applied across an energy storage capacitor 15. The MOSFET switches 10 and 11 are alternatively triggered ON and OFF by control signals, or pulses, supplied to the gate terminals of the MOSFET 10 and 11 from input terminals 17 and 18, respectively.

Generation of the control signals or pulses appearing at terminals 17 and 18, and the frequency of these signals, are not material factors of concern to an understanding of the present invention since this aspect of the illustrated circuitry is conventional. It will be sufficient to note simply that the control signals applied to the gate terminals of MOSFET's 10 and 11 bear a time relationship such that MOSFET's 10 and 11 are not in their ON states at the same time. The frequency of these control signals depends on the use to which the inverter is to be put, but may, for example, be on the order of 20 KHz.

MOSFET's 10 and 11, alternatively conductive, provide drive current to the primary windings 20 and 21 respectively, of an output transformer 23. Thus, the dc input from terminals 13 is effectively converted to alternating current by the push-pull action of MOSFET's 10 and 11 and ac output power may be taken from secondary windings 25 and 26 of the transformer 23.

Connected substantially in parallel with MOSFET 10 is an overvoltage protection network including series connected zener diodes 27 and 28. Also in parallel relationship with MOSFET 10 is a transient suppression network comprising series connected resistor 30 and capacitor 31. Similarly, series connected zener diodes 32 and 33 provide overvoltage protection to MOSFET 11 while transient suppression is provided by capacitor 35 and resistor 36.

Connected in series with MOSFET switches 10 and 11 are current sensing resistors 38 and 39, respectively. These resistors 38 and 39 are preferably selected such that they are relatively low in ohmic value, e.g., on the order of 0.1 ohm or so each. This is to insure that the resulting voltage drops are low and that the expenditure of power in these resistors is low in relationship to the output power of the inverter apparatus. The voltage drops are taken with respect to the common connection point 40 and are indicative of the instantaneous currents through the corresponding MOSFET switches 10 and 11.

The current indicative signals are applied to a synchronizing circuit which includes a comparator 42; reference setting resistors 43 and 44; filter capacitor 45; and input resistors 46 and 47. A reference voltage is established at one input 48 of comparator 42 by the voltage divider effect of resistors 43 and 44 which are connected in series to a source of regulated dc voltage, not specifically illustrated. The current indicative signals are applied in parallel through input resistors 46 and 47 to the other input 49 of the comparator 42. The result is that an output signal is produced from the comparator 42 (the occurrence of which is determined by the selection of the reference voltage applied at terminal 48) which is synchronized with the periods of current conduction by the MOSFET's 10 and 11. That is, for example, comparator 42 may be set to produce a high level output coincident with the conduction, or ON times, of MOSFET's 10 and 11. The result is a synchronizing signal which is applied to a reference generation source.

The reference generation source includes biasing resistors 51 and 52; transistor 53; zener diodes 54 and 55; fixed resistors 56-60; and capacitors 61 and 62. Transistor 53, along with threshhold establishing zener diode 54, may be viewed as normally in a conducting state. Thus, during this normal state, a relatively high level of voltage is established at the reference junction A of resistors 57 and 58.

The synchronizing signal from comparator 42 is applied to the base terminal of transistor 53 through resistor 51. Since the output of the comparator 42 is high coincidentally with the conduction of MOSFET's 10 and 11, transistor 53 is turned off also coincidentally with conduction times of MOSFET's 10 and 11. With transistor 53 turned off, the reference voltage at junction A begins to decay at a rate determined by capacitor 61 and resistors 57 and 58. The reference voltage continues to decay until the output of comparator 42 again goes low at such time as neither MOSFET 10 or 11 is conducting.

Figure 2:
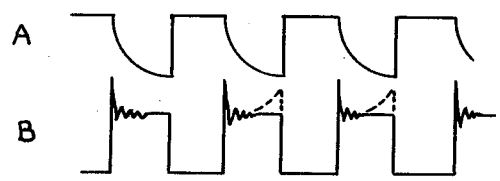
FIG. 2 is an illustration of waveforms showing the reference signal generated in the circuitry of FIG. 1 and a typical composite current pattern of current passing through the switching elements of FIG. 1.

FIG. 2 illustrates the time relationship of the reference voltage, at point A, and a composite waveform, at point B, for the conductive periods of MOSFET's 10 and 11. The composite waveform appears at circuit point B of FIG. 1A. It can be seen that the reference signal is periodic in form, which, during the conduction period, is initially high and then decays over time to a lower value, to be reset to the higher value as both MOSFET's become non-conducting. This particular voltage-time relationship is advantageous in that the reference is initially high to accommodate a certain amount of ringing or spiking at the leading edge of each conduction period when the reference and current signals are compared, but is low enough during the balance of the period to catch saturation and overloading effects. The ringing and saturation effects are illustrated in the point B waveforms of FIG. 2, the saturation effect being shown by a dashed line increase in current toward the trailing edge of the current pulses.

The periodic reference signal is applied to comparison circuitry comprised of two individual comparators 65 and 66. These comparators 65 and 66 simultaneously receive the reference signal, and also receive corresponding current indicative signals through input resistors 68 and 69, respectively. A biasing network is included for each comparator and comprises resistors 71 and 72 for comparator 65, and resistors 74 and 75 for comparator 66. These biasing networks are each connected to a regulated voltage source (not shown) to establish the proper operating voltage level at the current signal input terminals of the comparators 65 and 66. Filter capacitors 77 and 78 provide filtering of the respective current indicative signals and resistors 80 and 81 are tied to the regulated supply to establish the desired output voltage level at the output terminals of the corresponding comparator, 65, 66.

If, at any time, either current indicative signal exceeds the reference value, the appropriate one of comparator 65 or 66 is activated to produce a protection signal indicative of an excessive instantaneous value of current in the corresponding MOSFET. It will be recognized, of course, that both comparators may be activated alternatively, in step with the MOSFET push-pull action, if current through both MOSFET's 10 and 11 is indeed excessive. Thus, comparator 65 is activated if current through MOSFET 10 is too high; compartor 66 is activated if current through MOSFET 11 is too high.

The protection signals from the comparators 65 and 66 are applied to first and second protection circuits associated with MOSFET's 10 and 11, respectively. The first protection circuit includes a pair of transistors 83 and 84 and a pair of resistors 85 and 86; the second protection circuit (substantially identical to the first) includes transistors 88 and 89 and resistors 90 and 91. Operation of the two protection circuits is substantially identical. For example, a negative going signal from comparator 65 (indicative of excessive current in MOSFET 10) sends transistors 83 and 84 into a conductive state if the input signal at line 17 is simultaneously calling for MOSFET 10 to be in an ON state. The result is that line 17 is pulled substantially to the common point (ground) potential and MOSFET 10 is turned OFF, i.e., rendered non-conducting. The second protection circuit, associated with MOSFET 11, functions in a similar manner to shut down MOSFET 11. It will be recognized that all actions carried out in the above described circuitry in the event of an overcurrent condition occur substantially instantaneously and that, by shutting off that MOSFET through which excessive current is flowing, the deleterious effects associated with excessively high currents are avoided.

While the foregoing has described the invention in terms of a preferred embodiment, it will be understood that various modifications may be made therein without deviation from the scope of the invention. For example, the protective circuits described above may be implemented in various ways including circuitry which makes use of programmable uni-junction transistors. It is intended by the appended claims to claim all such modifications and embodiments which fall within the true spirit and scope of the invention.

The invention claimed is:
1. In a push-pull network having alternately activated first and second current switches controlling drive current through, respectively, first and second windings of an output transformer, overcurrent protection circuitry comprising:
  (a) first and second current sensing means providing first and second sensing signals indicative of the instantaneous current through said first and second current switches, respectively;

(b) synchronizing means responsive to said first and second sensing signals to produce a synchronizing signal indicative of the active periods of said first and second current switches;

(c) a reference source responsive to said synchronizing signal to produce a periodic reference signal whose value is time dependent during the active periods of said first and second current switches;

(d) comparing means responsive to said first and second sensing signals and said reference signal to produce first and second protection signals indicative of whether said first and second sensing signals exceed said reference signal as an indication of overcurrent in said first and second current switches, respectively; and (e) first and second protection means responsive to said first and second protection signals to deactivate said first and second current switches whenever an overcurrent occurs therein, respectively.

2. The protection circuitry of claim 1 wherein said reference source includes means causing said reference signal to decline from a higher to a lower value during the active periods of said current switches.

3. The protection circuitry of claim 2 wherein said reference source includes:

(a) switching means operable between ON and OFF states in response to said synchronizing signal; and (b) capacitor means responsive to one state of said switching means to cause said reference signal to decline at a predetermined rate.

4. The protection circuitry of claim 3 wherein said synchronizing means comprises a comparator network for alternatively comparing said sensing signals to a reference value to produce said synchronizing signal.

5. The protection circuitry of claim 4 wherein said comparing means includes first and second comparator networks, said first comparator network providing said first protection signal whenever said first sensing signal exceeds said reference signal and said second comparator providing said second protection signal whenever said second sensing signal exceeds said reference signal.

6. The protection circuitry of claim 5 wherein said first and second current sensing means each comprises a low ohmic valued resistor connected in series with said first and second current switches, respectively.

7. The protection circuitry of claim 6 wherein said first and second protection means each comprises a transistor switching network.

8. The protection circuitry of claim 7 wherein the switching means of said reference source comprises a transistor switch.

9. The protection circuitry of claim 8 further including:

(a) means comprising a filter network for protecting said first and second current switches from electrical transients; and (b) means comprising zener diodes for protecting said first and second current switches from excessively high voltages.

* * * * *